United States Patent
Martin et al.

(10) Patent No.: US 6,748,741 B2
(45) Date of Patent: Jun. 15, 2004

(54) CHARGE AIR CONDENSATION COLLECTION SYSTEM FOR ENGINES WITH EXHAUST GAS RECIRCULATION

(75) Inventors: Steven P. Martin, Walnut, CA (US); Glenn F. Thompson, Palos Verdes Estates, CA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/279,486

(22) Filed: Oct. 23, 2002

(65) Prior Publication Data

US 2004/0079079 A1 Apr. 29, 2004

(51) Int. Cl.[7] ................................. F02B 33/44
(52) U.S. Cl. .................... 60/605.2; 60/605.1; 60/599; 123/563; 123/559.1; 55/325
(58) Field of Search ................ 60/605.2, 605.1, 60/599; 123/563, 559.1; 55/355, 363, 385.3, 325, 391

(56) References Cited

U.S. PATENT DOCUMENTS

| | | | |
|---|---|---|---|
| 3,397,682 A | 8/1968 | Riggan | |
| 3,775,976 A | 12/1973 | Karig | |
| 3,807,373 A | 4/1974 | Chen | |
| 4,014,671 A | * 3/1977 | Andro et al. | 55/325 |
| 4,055,158 A | 10/1977 | Marsee | |
| 4,237,689 A | * 12/1980 | Sampietro | 60/599 |
| 4,328,781 A | 5/1982 | Morita | |
| 4,426,967 A | * 1/1984 | McWhorter | 123/559.1 |
| 4,503,813 A | 3/1985 | Lindberg | |
| 4,643,157 A | 2/1987 | Nishikawa et al. | |
| 4,696,279 A | 9/1987 | Lindberg | |
| 5,034,037 A | * 7/1991 | Harold et al. | 60/605.1 |
| 5,269,143 A | 12/1993 | Cikanek et al. | |
| 5,490,488 A | 2/1996 | Aversa et al. | |
| 6,145,498 A | * 11/2000 | Packard et al. | 123/563 |
| 6,293,264 B1 | 9/2001 | Middlebrook | |
| 6,367,256 B1 | 4/2002 | McKee | |
| 6,427,639 B1 | 8/2002 | Andrews et al. | |
| 2002/0189256 A1 | 12/2002 | Kalish | |

FOREIGN PATENT DOCUMENTS

| | | | | |
|---|---|---|---|---|
| DE | 953129 A | * 11/1956 | | 60/599 |
| GB | 2018358 A | * 10/1979 | | F02B/24/04 |
| JP | 61223214 | 10/1986 | | |
| SU | 1305508 A1 | * 7/1985 | | F25B/39/04 |
| SU | 1620771 A2 | * 1/1991 | | F17D/3/08 |
| WO | WO 96/30635 | 10/1996 | | |

* cited by examiner

Primary Examiner—Thomas Denion
Assistant Examiner—Thai-Ba Trieu
(74) Attorney, Agent, or Firm—Ephraim Starr; Brian Pangrle (57) ABSTRACT

A charge air condensation separation system for a turbocharged engine, especially suited for engines employing EGR, includes a turbocharger having a compressor providing charge air with a charge air cooler connected to the compressor to cool the charge air. A charge air delivery duct is connected to an outlet of the charge air cooler and a torroidal trap having an annular inlet is disposed in the charge air delivery duct with a sump for collecting condensation integral to the torroidal trap. A drain line for removing condensation from the sump for expulsion to the atmosphere is connected to the trap and a pump or other device for overcoming pressure differential in the drain line is employed in certain embodiments. For EGR systems employing a mixer, the condensation separator can be incorporated adjacent to or integral with the mixer to minimize additional volume requirements in the engine compartment.

11 Claims, 7 Drawing Sheets

CHARGE AIR CONDENSATION COLLECTION SYSTEM FOR ENGINES WITH EXHAUST GAS RECIRCULATION

BACKGROUND OF THE INVENTION

1. Field of the Invention

This invention relates generally to the field of engine charge air intake systems and, more particularly, to a system for collecting condensation present in cooled charge air from a turbocharger prior to introduction into the engine intake manifold and mixing with recirculated exhaust gas.

2. Description of the Related Art

Most turbocharged engines, particularly heavy duty diesel engines, use charge air cooling to increase the brake specific horsepower output for the given engine displacement. Typically, a charge air cooler is used to cool the charge air from the turbocharger compressor. As the charge air is cooled, free water is formed from the condensed ambient humidity. With the introduction of Exhaust Gas Recirculation (EGR) systems onto heavy duty diesel engines, excessive condensation entrained within the engine's charge air system has become a concern. The EGR system coats the intake manifold and other portions of the engine with products of combustion which, when dissolved in the normal condensation from the charge air system, results in an acid solution. It has been demonstrated that this acid solution has a negative impact on the durability of the engine.

EGR systems utilize an EGR mixer in the charge air system to assist the flow of EGR into the engine's intake system. In certain EGR systems a Venturi in the charge air system is use to assist the flow of EGR into the engine's intake system.

It is therefore desirable to extract the condensation from the charge air system prior to mixing with recirculated exhaust gas to prevent or minimize the formation of acid solutions which can damage the engine.

It is also desirable that a condensation separator be integrated into the charge air Venturi design, for engines employing that type of device, such that a compact system of water extraction as well as Venturi assisted EGR flow is achieved.

SUMMARY OF THE INVENTION

The present invention provides a charge air condensation separation system for a turbocharged engine. Especially suited for engines employing EGR, the system includes a turbocharger having a compressor providing charge air with a charge air cooler connected to the compressor to cool the charge air. A charge air delivery duct is connected to an outlet of the charge air cooler and a torroidal trap having an inlet annularly disposed in the charge air delivery duct is provided with an integral sump for collecting the condensate. The system is completed with a drain line for removing condensate from the sump for expulsion to the atmosphere. A pump or other device for overcoming pressure differential in the drain line is employed in certain embodiments.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
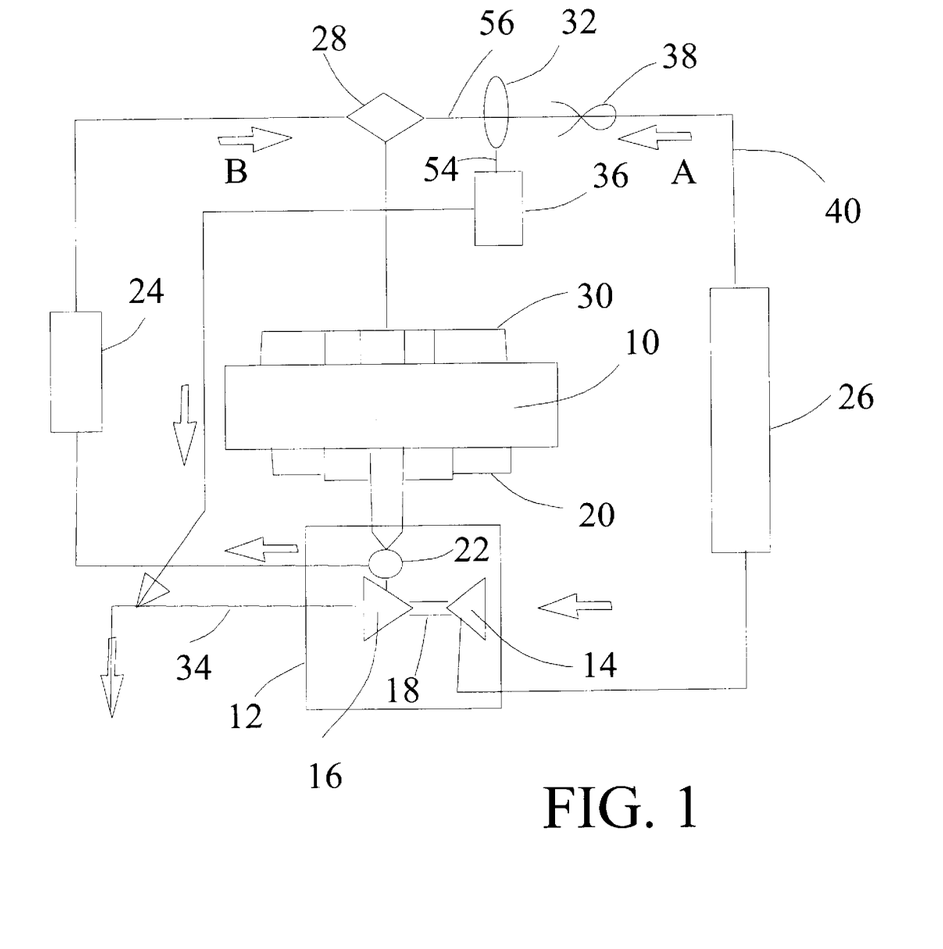
FIG. 1 is a schematic block diagram of an engine system embodiment employing a condensation separator according to the present invention.

Turning to the drawings, FIG. 1 shows an engine 10 having a turbocharger 12. Inlet air is received by the compressor 14 which is driven by the turbine 16 through a shaft 18. The turbine is powered by exhaust gas received from the exhaust manifold 20 of the engine and typically has a variable geometry inlet nozzle for performance enhancement. A flow control valve 22, in conjunction with backpressure control by the variable geometry inlet nozzle, where present, extracts a portion of the exhaust gas flow for recirculation through an exhaust gas cooler 24. The charge air output from the compressor is routed through a charge air cooler (CAC) 26.

The charge air and recirculated exhaust gas flows, generally designated by arrows A and B are combined in a mixer 28 for introduction into the engine intake manifold 30. A torroidal condensation separator 32 is located in the charge are inlet line between the CAC and EGR mixer. Condensate collected is routed to the exhaust outlet line 34 of the turbocharger where it is vaporized by the high temperature exhaust gas and is entrained in the exhaust gas stream from the vehicle to the atmosphere as water vapor or steam. In some applications, to accommodate pressure matching, a pump 36 is present between the separator and exhaust gas outlet line. In conditions where the charge air has high velocity approaching the separator, a swirl generator 38 is inserted to urge the condensate in the flow to the walls of the charge air duct 40.

Figure 2:
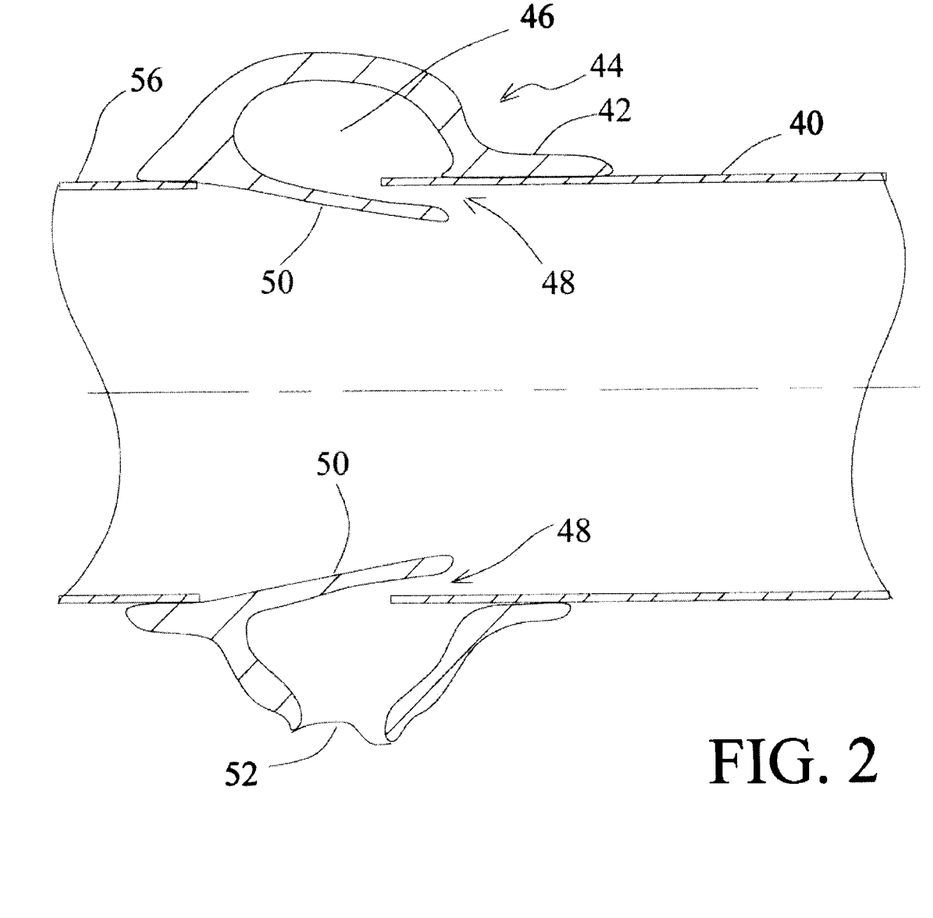
FIG. 2 is a sectional elevation view of one embodiment of a condensation separator for the system in FIG. 1.

A torroidal condensate separator for application of the present invention is shown in FIG. 2. For the embodiment shown, the charge air duct 40 is received into a sleeve 42 integral to a casting 44. The casting incorporates a torroidal reservoir 46 with an inlet 48 formed by an annular lip 50. Condensation in the charge air flow naturally migrates to the walls of the duct in the majority of flow conditions and is assisted by the swirl generator in high velocity conditions. The inlet to the torroidal reservoir created by the reduced diameter lip naturally receives and diverts the condensate flow from the charge air duct into the torroidal reservoir. Condensate collected flows to an outlet 52 cast into the lower portion of the casting to which a condensate flow line 54, as shown in FIG. 1, is attached.

Figure 3:
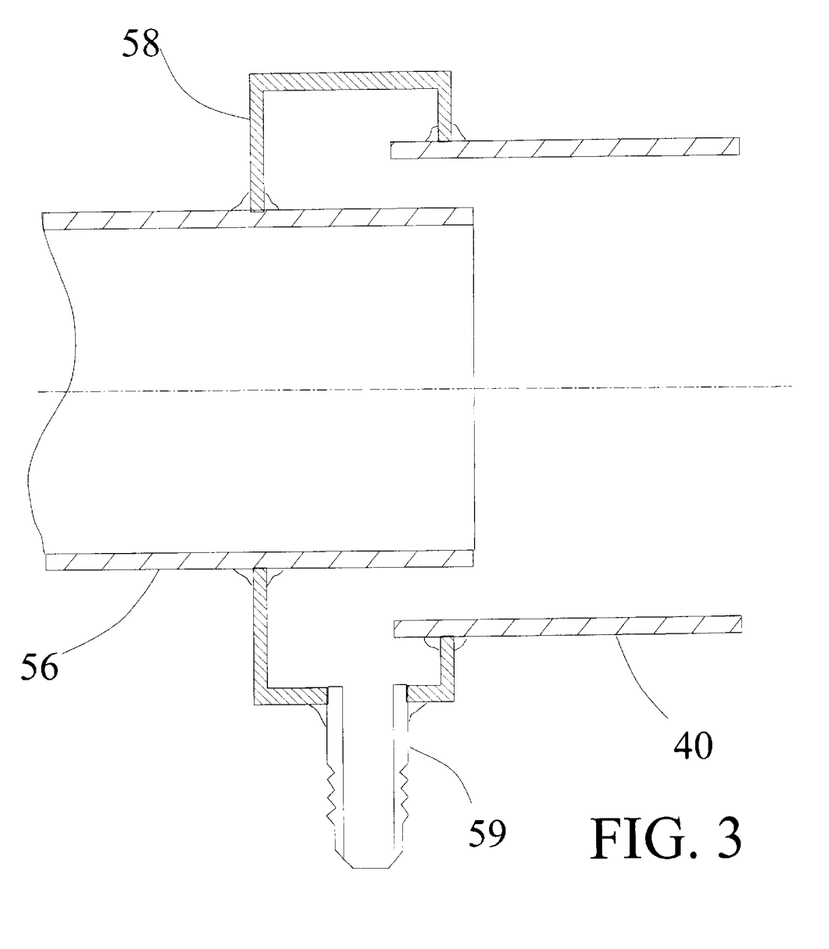
FIG. 3 is a sectional elevation view of a second embodiment of a condensation separator.

The charge air flow continues through the condensation separator and exits into a mixer attachment duct 56. In certain alternative embodiments, the mixer attachment duct is an integral portion of the casting. One additional alternative embodiment is shown in FIG. 3 wherein the mixer attachment duct is a smaller diameter than the charge air duct from the CAC and the annular inlet is formed by the extension of the mixer attachment duct into the charge air duct. The torroidal reservoir is formed by a machined, cast or welded structure generally designated 58. A fitting 59 is provided for attachment of the condensate flow line.

The present invention is particularly well suited to applications employing a venturi for EGR mixing. The condensation separator and EGR inlet volute are integrated into a single casting or machined component resulting in a compact and highly functional unit for engine applications where component space may be at a premium. Such a system is disclosed schematically in FIG. 4. The engine, turbocharger, CAC and EGR cooler operate substantially as described previously with respect to FIG. 1. Recirculated exhaust gas is routed from the EGR cooler into the EGR mixer duct 60. The mixer incorporates a venturi 62 which provides pressure differential for drawing the exhaust gas into the mixer and entraining it with the charge air. The torroidal condensation separator is integrated immediately adjacent the EGR inlet volute as shown in FIG. 5.

In the embodiment of the integrated condensation separator and EGR mixer shown, the torroidal reservoir is partially defined by an internal wall 64 and lip 66 which are contoured to form the converging portion of the venturi for the mixer. The EGR volute 68 opens into the mixer through annular inlet 70 at the throat of the venturi for entrainment of the exhaust gas into the charge air flow. The downstream wall 72 of the mixer is contoured to form the expanding nozzle of the venturi. The condensate from the charge air duct, which enters the mixer with a larger diameter than the internal wall and lip, is diverted by the internal wall and lip into the reservoir. While the embodiment in the drawings depicts the mixer as two castings to more clearly define the EGR and charge air portions of the integrated mixer, a single casting or a combination of machined elements are employed in alternative embodiments. The EGR mixer duct attaches to inlet boss 74 on the mixer while the condensate flow line attaches to drain boss 76.

Figure 4:
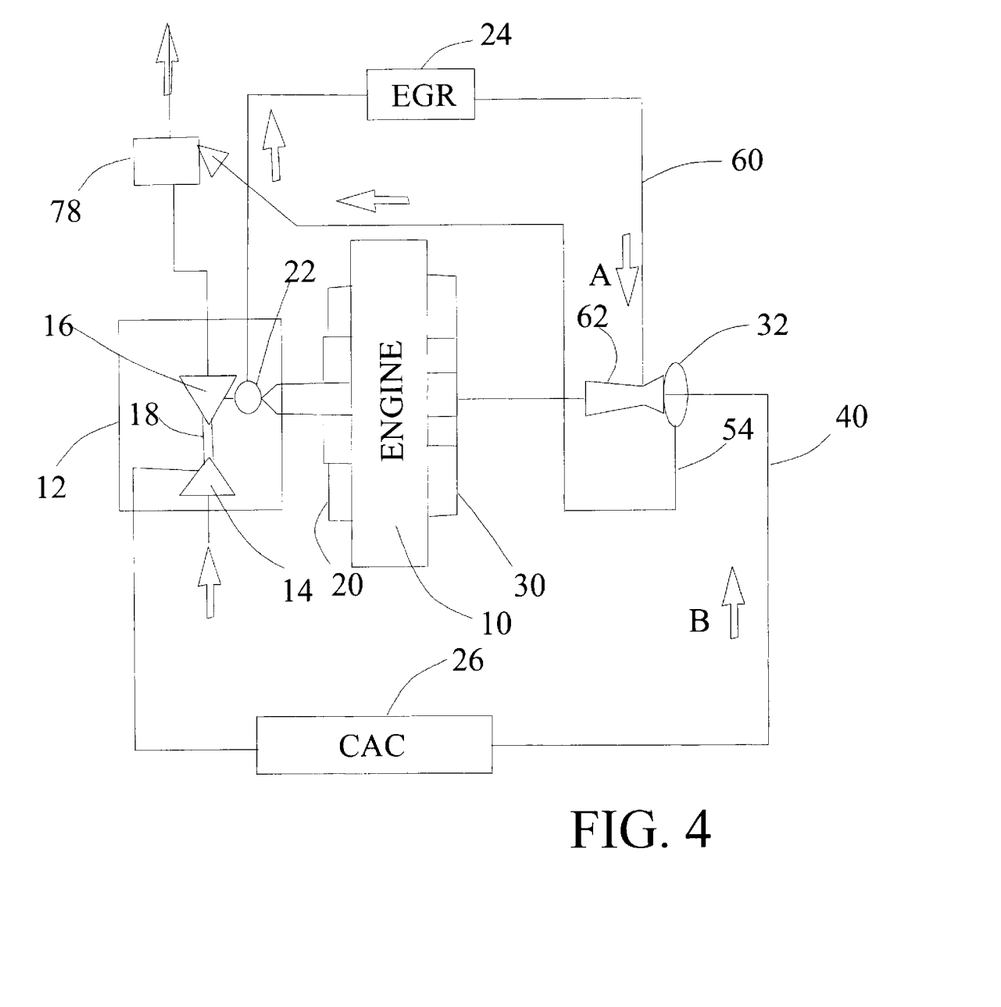
FIG. 4 is a schematic block diagram of an engine system embodiment employing a condensation separator integrated with a venturi EGR device according to the present invention.
Figure 5:
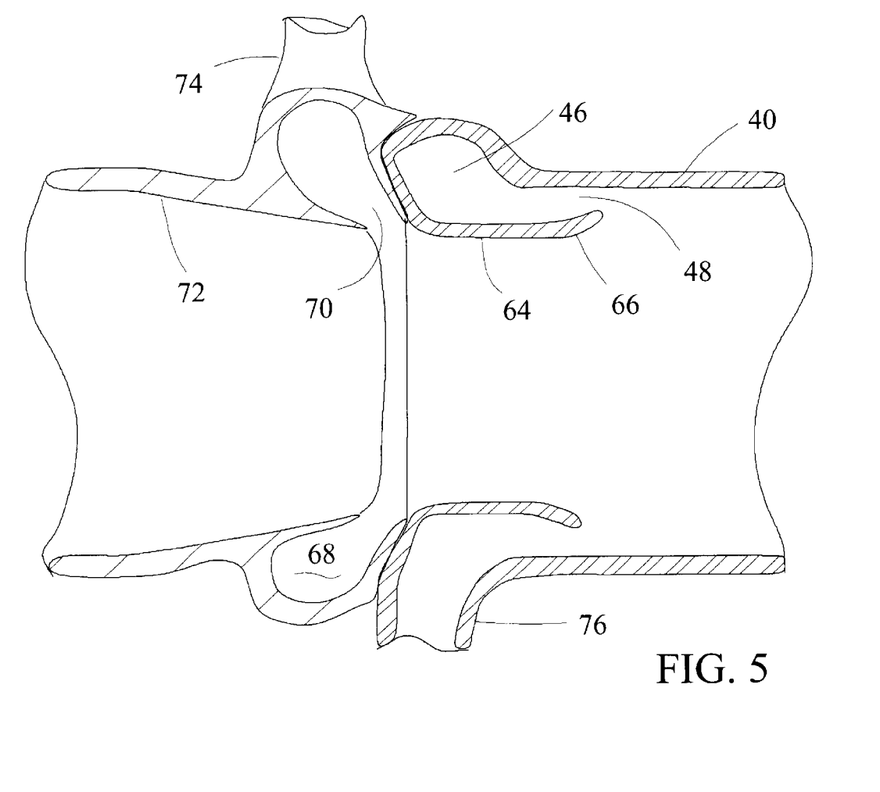
FIG. 5 is a sectional elevation view of an embodiment of an integrated EGR mixer and condensation separator for the system of FIG. 3.
Figure 6:
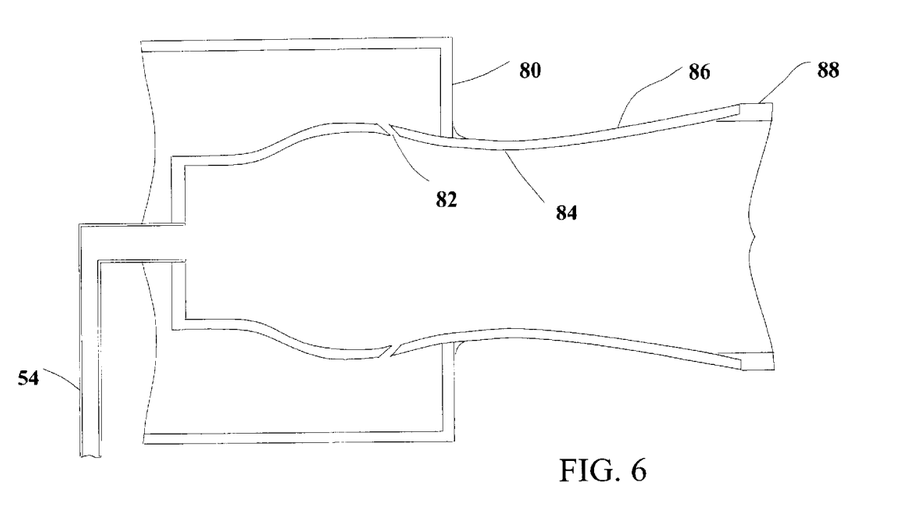
FIG. 6 is a sectional elevation view of an embodiment of a coanda effect device to be employed with the system of FIGS. 1 or 3.

For certain embodiments of the invention, flow through the condensate flow line to the exhaust gas outlet of the turbocharger as shown in FIGS. 1 and 4 is enhanced with the use of a pump 36 as generally shown in FIG. 1. A fluidic pump 78 employing the coanda principle is applicable for use in the system and is shown schematically in FIG. 4. Details of a pump of this nature are disclosed in U.S. Pat. No. 5,974,802 having a common assignee with the present invention. The '802 patent discloses the use of a coanda effect device for pumping exhaust gas in an EGR system and the details of that specification are incorporated herein by reference as though fully set forth. FIG. 6 discloses and exemplary embodiment of the coanda effect device as employed in the system shown in FIG. 4. The primary flow for the coanda device is provided by the exhaust flow from the turbocharger. Entrainment of the condensate flow as the secondary flow in the coanda device provides pressure differential urging the flow of condensate from the trap to the turbocharger exhaust outlet for vaporization and expulsion from the vehicle as steam or water vapor. An exhaust line 80 from the turbocharger provides high pressures exhaust gas as the primary fluid for the coanda device. The exhaust gas enters the primary inlet 82 providing an energetic stream for entrainment of the condensate stream which enters from the line 54. The throat 84 and expansion nozzle 86 of the coanda device are shown for reference. The exhaust pipe 88 for the vehicle is attached to the nozzle.

Figure 7:
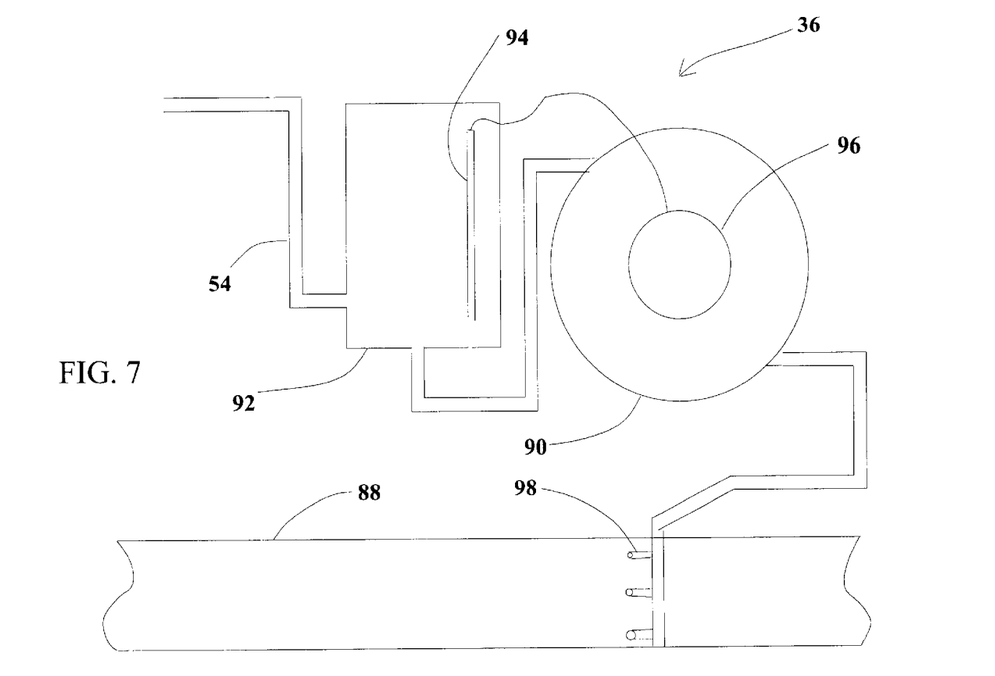
FIG. 7 is a schematic view of an embodiment of a positive displacement pump to be employed with the system of FIGS. 1 or 3 for removal of condensate.

Alternatively, a positive displacement pump, either mechanically or electrically driven, is employed to pump the condensate into the exhaust line for vaporization and expulsion. As shown in FIG. 7 a pump 90 is attached to the condensate line to receive the condensate. A collector 92 is equipped with a sensor 94, for the embodiment shown, which activates an electric motor 96 to pump condensate into the entrainment orifices 98 in the exhaust line for vaporization. A capacitive sensor as shown or a simple float device may be applicable in certain embodiments.

Figure 8:
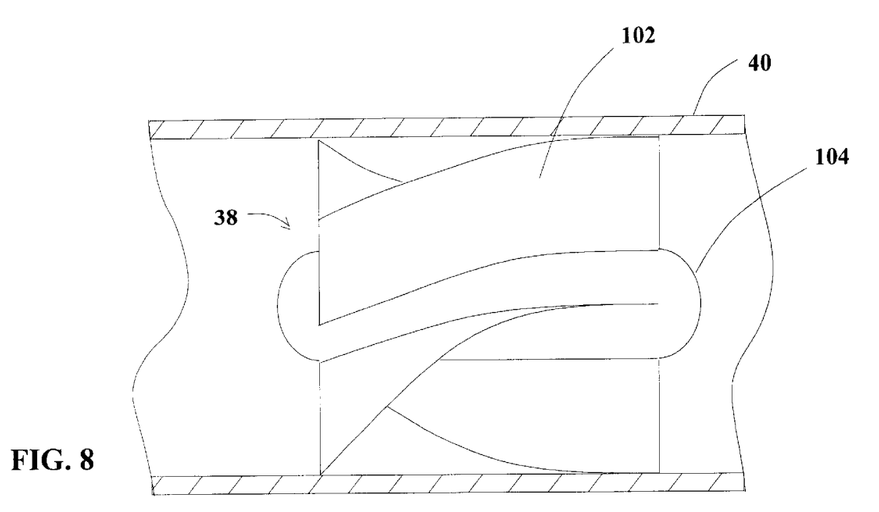
FIG. 8 is an exemplary swirl generator for use in the system of FIGS. 1 or 3.

As previously described with respect to FIG. 1, a swirl generator 38 is employed in the charge air duct 40 in certain embodiments to urge condensate to the wall of the duct under certain flow conditions. FIG. 8 shows an exemplary swirl generator having curved vanes 102 mounted on an aerodynamic body 104 centered in the charge air duct upstream of the condensation separator. For the embodiment shown, the swirl vanes are attached to the wall of the duct to support the vane and body structure.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A charge air condensation separation system for a turbocharged engine comprising:
    a turbocharger having a compressor providing charge air;
    a charge air cooler connected to the compressor and receiving the charge air;
    a charge air delivery duct connected to an outlet of the charge air cooler;
    a torroidal tap having an inlet annularly disposed in the change air delivery duct with means for collecting condensation integral to the torroidal trap; and
    means for removing condensation from the collecting means for expulsion to the atmosphere wherein the removing condensation means comprises a condensate line connected to the drain connection fitting for conveying condensate from the sump to an exhaust outlet of the turbocharger.

2. The charge air condensation separation system as defined in claim 1 wherein the removing condensation means further comprises a pump for energizing the condensate flow from the sump.

3. The charge air condensation separation system as defined in claim 2 wherein the pump is a coanda device with a primary duct connected to the turbocharger exhaust outlet and having a primary stream comprising the exhaust outlet flow from the turbocharger and an entrainment duct connected to the condensate line with an entrainment stream comprising the condensate flow.

4. A charge air condensation separation system for a turbocharged engine comprising:
    a turbocharger having a compressor providing charge air;
    a charge air cooler connected to the compressor and receiving the charge air;
    a charge air delivery duct connected to an outlet of the charge air cooler;
    a torroidal trap having an inlet annularly disposed in the charge air delivery duct with means for collecting condensation integral to the torroidal trap;

means for removing condensation from the collecting means for expulsion to the atmosphere; and an EGR mixer connected to the charge air delivery duct downstream of the torroidal trap for introducing recirculated exhaust gas to the charge air prior to an inlet manifold for the engine.

5. A charge air condensation separation system for a turbocharged engine comprising:

a turbocharger having a compressor providing charge air;

a charge air cooler connected to the compressor and receiving the charge air;

a charge air delivery duct connected to an outlet of the charge air cooler;

a torroidal trap having an inlet annularly disposed in the charge air delivery duct with means for collecting condensation integral to the torroidal trap;

means for removing condensation from the collecting means for expulsion to the atmosphere; and a swirl generator mounted in the charge air deliver duct upstream from the torroidal trap.

6. A charge air condensation separation system for a turbocharged engine having EGR mixing comprising:

a turbocharger having a compressor providing charge air;

a charge air cooler connected to the compressor and receiving the charge air;

a charge air delivery duct connected to an outlet of the charge air cooler;

a torroidal trap having an inlet annularly disposed in the charge air delivery duct with means for collecting condensation integral to the torroidal trap an EGR mixer connected to the charge air delivery duct downsream adjacent the torroidal trap; and means for removing condensation from the collecting means for expulsion to the atmosphere.

7. The charge air condensation separation system as defined in claim 6 wherein the collecting means comprises:

a sump integrally formed in a lower portion of the torroidal trap; and a drain connection fitting.

8. The charge air condensation separation system as defined in claim 7 wherein the removing condensation means comprises a condensate line connected to the drain connection fitting for conveying condensate from the sump to an exhaust outlet for the turbocharger.

9. The charge air condensation separation system as defined in claim 8 wherein the removing condensation means further comprises a pump for energizing the condensate flow from the sump.

10. The charge air condensation separation system as defined in claim 9 wherein the pump is a coanda device with a primary duct connected to the turbocharger exhaust outlet and having a primary stream comprising the exhaust outlet flow from the turbocharger and an entrainment duct connected to the condensate line with an entrainment stream comprising the condensate flow.

11. The charge air condensation separation system as defined in claim 6 further comprising a swirl generator mounted in the charge air delivery duct upstream from the torroidal trap.

\* \* \* \* \*